US008867480B2

(12) United States Patent
Van Stralen et al.

(10) Patent No.: US 8,867,480 B2
(45) Date of Patent: Oct. 21, 2014

(54) SPECIFICATION OF A FREQUENCY AGILE DYNAMIC SPECTRUM ACCESS TDMA METHOD

(75) Inventors: Nick A. Van Stralen, Bloomfield, NY (US); Clifford Hessel, Rochester, NY (US)

(73) Assignee: Harris Corporation, Melbourne, FL (US)

( * ) Notice: Subject to any disclaimer, the term of this patent is extended or adjusted under 35 U.S.C. 154(b) by 461 days.

(21) Appl. No.: 13/313,682

(22) Filed: Dec. 7, 2011

(65) Prior Publication Data

US 2013/0148626 A1  Jun. 13, 2013

(51) Int. Cl.
*H04W 4/00* (2009.01)

(52) U.S. Cl.
USPC .......................................................... 370/330

(58) Field of Classification Search
None
See application file for complete search history.

(56) References Cited

U.S. PATENT DOCUMENTS

| | | | |
|---|---|---|---|
| 5,130,987 A | 7/1992 | Flammer | |
| 7,551,892 B1 | 6/2009 | Elliott | |
| 2009/0167521 A1* | 7/2009 | Edwards et al. | 340/539.1 |
| 2010/0081387 A1 | 4/2010 | Shi et al. | |
| 2010/0232372 A1* | 9/2010 | Jakllari et al. | 370/329 |
| 2011/0021152 A1 | 1/2011 | Memik et al. | |

FOREIGN PATENT DOCUMENTS

| | | |
|---|---|---|
| EP | 1 453 258 A1 | 9/2004 |
| WO | WO-98 12829 A1 | 3/1998 |

OTHER PUBLICATIONS

Information about Related Patents and Patent Applications, see section 6 of the accompanying Information Disclosure Statement Letter, which concerns Related Patents and Patent Applications. Jul. 10, 2012.

Agrawal, P., et al., "Network Architecture for Mobile and Wirless ATM", Distributed Computing Systems, 1996. Proceedings of the 16th International Conference on Hong Kong, May 27-30, 1996, Los Alamitos, CA, USA, IEEE Comput. Soc. US, May 27, 1996, pp. 299-310.

European Search Report mailed Apr. 26, 2013; European Application No. 13000416.1-1854 in the name of Harris Corporation.

Popovski, P., et al., "Strategies for Adaptive Frequency Hopping in the Unlicensed Bands", IEEE Wireless Communications, IEEE Service Center, Piscataway, NJ, US, vol. 13, No. 6, Dec. 1, 2006, pp. 60-67.

(Continued)

*Primary Examiner* — Andrew Lai
*Assistant Examiner* — Leon Andrews
(74) *Attorney, Agent, or Firm* — Fox Rothschild LLP; Robert J. Sacco, Esq.

(57) ABSTRACT

Dynamic spectral assignment in an ad hoc network of wireless network nodes (200) includes determining (306) a set of allowed frequencies that can be used by the ad hoc network and a corresponding index value for each of the allowed frequencies. An allowed list is created (308) and comprised of the index values (312) arranged in a deterministic order. A pointer (604) into the allowed list (600) is determined for each one of a total of Nhop frequency hops of a hopping sequence. Each pointer specifies one of the allowed frequencies (601) to be used for a corresponding one of the frequency hops. A wireless frequency hopping communication session is performed among a plurality of the nodes in the ad hoc network, using a frequency for each hop of the hopping sequence as specified by the pointers (604).

37 Claims, 6 Drawing Sheets

(56) References Cited

OTHER PUBLICATIONS

Asterjadha, A., et al., "A Distributed Network Coded Control Channel for Multihop Cognitive Radio Networks", IEEE Network, IEEE Service Center, New York, NY, US, vol. 23, No. 4, Jul. 1, 2009, pp. 26-32.

Clancy, C., et al., "Applications of Machine Learning to Cognitive Radio Networks", IEEE Wireless Communication,IEEE Service Center, Piscataway, NJ, US, vol. 14, No. 4, Aug. 1, 2007, pp. 47-52.

European Search Report mailed Mar. 21, 2013; Application Serial No. 12008104.7-1845; in the name of Harris Corporation.

* cited by examiner

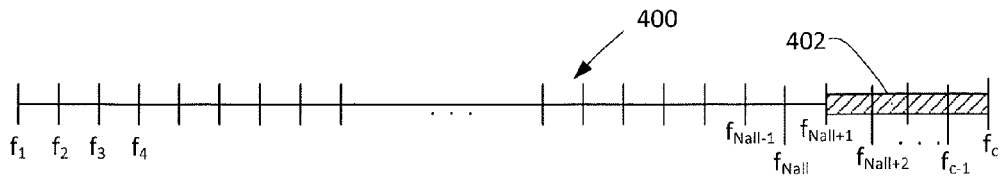
FIG. 4
| Master List | Authorization |
|---|---|
| $f_1$ | Allowed |
| $f_2$ | Allowed |
| $f_3$ | Allowed |
| $f_4$ | Allowed |
| . | . |
| . | . |
| . | . |
| $f_{Nall-1}$ | Allowed |
| $f_{Nall}$ | Allowed |
| $f_{Nall+1}$ | Not Allowed |
| $f_{Nall+2}$ | Not Allowed |
| . | . |
| . | . |
| . | . |
| $f_{c-1}$ | Not Allowed |
| $f_c$ | Not Allowed |
FIG. 5
| Pointer | Status | Freq. | Allowed List |
|---|---|---|---|
| 0 | Clear | $f_2$ | 2 |
| 1 | Clear | $f_{Nall}$ | Nall |
| 2 | Clear | $f_4$ | 4 |
| 3 | Clear | $f_{Nall-1}$ | Nall-1 |
| . | . | . | . |
| . | . | . | . |
| . | . | . | . |
| Nall-2 | Clear | $f_1$ | 1 |
| Nall-1 | Clear | $f_3$ | 3 |
FIG. 6
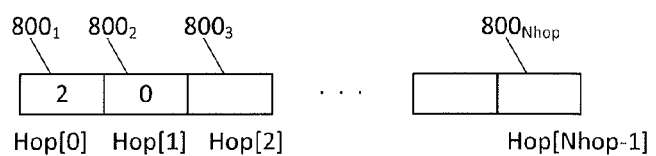
FIG. 8
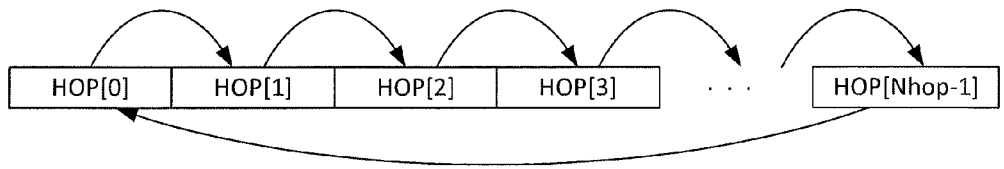
FIG. 7

SPECIFICATION OF A FREQUENCY AGILE DYNAMIC SPECTRUM ACCESS TDMA METHOD

BACKGROUND OF THE INVENTION

1. Statement of the Technical Field

The invention concerns ad-hoc radio networks, and more particularly ad hoc radio networks that use dynamic spectrum access methods.

2. Description of the Related Art

Cognitive radio systems comprise a network of radio transceivers that automatically change their transmission or reception parameters in response to a spectral environment. This process of dynamic frequency modification is sometimes referred to as dynamic spectral assignment. In such a system, the radio transceivers automatically choose the frequency on which to communicate with each other. The frequency used to communicate among network nodes is usually selected in such a way as to minimize interference with other users of the same spectrum. For example, the frequency can be selected to avoid interference with a class of wireless spectrum user which has been designated as a primary user of such spectrum. The active control over the parameters of transmission and reception generally relies upon certain cognitive radio activities, such as spectrum monitoring and dynamic selection of transmission frequency among network nodes.

SUMMARY OF THE INVENTION

Embodiments of the invention concern dynamic spectral assignment in an ad hoc network of wireless network nodes. The dynamic spectral assignment includes determining a set of allowed frequencies that can be used by the ad hoc network and a corresponding index value for each of the allowed frequencies. An allowed list is created and comprised of the index values arranged in a deterministic order. A pointer into the allowed list is determined for each one of a total of Nhop frequency hops of a hopping sequence. Each pointer specifies one of the allowed frequencies to be used for a corresponding one of the frequency hops. A wireless frequency hopping communication session is performed among a plurality of the nodes in the ad hoc network, using a frequency for each hop of the hopping sequence as specified by the pointers. The method involves dynamically assigning an updated pointer value to selected hops in the hopping sequence to specify an updated frequency to be used for that hop of the hopping sequence. The invention also includes a system for dynamic spectral assignment in an ad hoc network of wireless network nodes. The system includes a network node including at least one computer processing device configured to perform the steps described above.

BRIEF DESCRIPTION OF THE DRAWINGS

Embodiments will be described with reference to the following drawing figures, in which like numerals represent like items throughout the figures, and in which:

FIG. 4 is graphic illustration of a portion of a frequency spectrum that is useful for understanding the invention.

FIG. 5 is a table including a master list that is useful for understanding the invention.

FIG. 6 is a table including an allowed list that is useful for understanding the invention.

FIG. 7 is a drawing that is useful for understanding a hopping sequence.

FIG. 8 is a drawing that is useful for understanding a set of hop indices.

DETAILED DESCRIPTION

The present invention is described with reference to the attached figures. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operation are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

Figure 1:
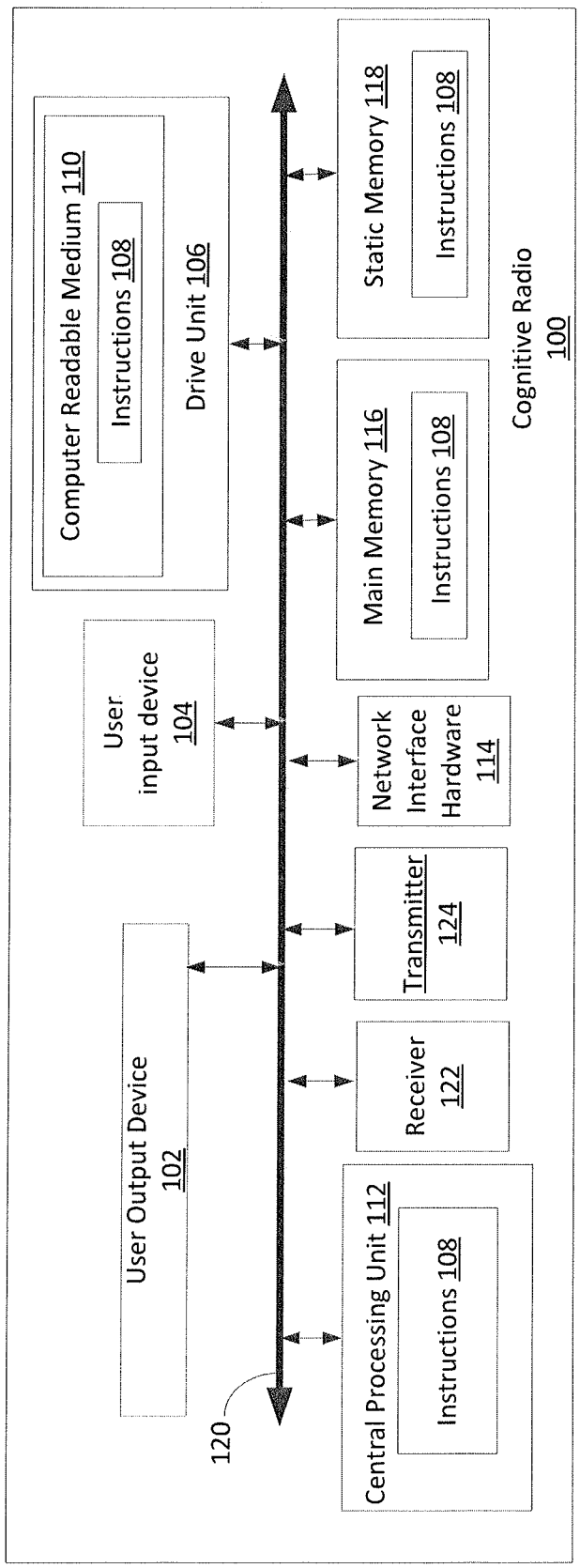
FIG. 1 is a block diagram that is useful for understanding a network node of a frequency agile ad hoc network that incorporates dynamic spectrum access methods

FIG. 1 shows a cognitive radio 100 that is useful for understanding the invention. The cognitive radio 100 can include a central processing unit 112, a user a main memory 116, and a static memory 118, which communicate with each other via system bus 120. Cognitive radio 100 can also include a transmitter 124 through which radio frequency signals may be transmitted, and a receiver through which radio frequency signals can be received. According to a preferred embodiment, the cognitive radio 100 includes a transceiver in place of the receiver and transmitter, where the transceiver operates as both a transmitter and receiver.

One or more user input devices 104 can be included in the cognitive radio 100, such as a keyboard and/or cursor control device. A user output device 104, such as a display screen can be used to communicate information to the user concerning the operations and status of the cognitive radio 100. User input devices 104 and user output devices 102 can communicate with the central processing unit through a system bus, but may also be connected by other interface and bus structures. Network interface hardware 114 can facilitate data communication operations with other data processing equipment to which the cognitive radio device is connected by wired or wireless means.

A drive unit 106 includes a computer-readable storage medium 110 on which is stored one or more sets of instructions 108 (e.g., software code) configured to implement one or more of the methodologies, procedures, or functions described herein. The instructions 108 can also reside, completely or at least partially, within the main memory 116, the static memory 118, and/or within the central processing unit 112 during execution thereof by the cognitive radio 100. The main memory 116 and the central processing unit 112 also can constitute machine-readable media.

The term "computer-readable storage medium" shall be understood to include any medium that is capable of storing, encoding or carrying a set of instructions for execution by the machine and that cause the machine to perform any one or more of the methodologies of the present disclosure. The term "computer-readable medium" shall accordingly be taken to include, but not be limited to, solid-state memories such as a memory card or other package that houses one or more read-only (non-volatile) memories, random access memories, or other re-writable (volatile) memories; magneto-optical or optical medium such as a disk or tape. Accordingly, the disclosure is considered to include any one or more of a computer-readable medium or a distribution medium, as listed herein and to include recognized equivalents and successor media, in which the software implementations herein are stored. Those skilled in the art will appreciate that the device architecture illustrated in FIG. 1 is one possible example of a cognitive radio. However, the invention is not limited in this regard and any other suitable computing device architecture can also be used without limitation.

Dedicated hardware implementations including, but not limited to, application-specific integrated circuits, programmable logic arrays, and other hardware devices can likewise be constructed to implement the methods described herein. Applications that can include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the exemplary system is applicable to software, firmware, and hardware implementations.

In accordance with various embodiments of the present invention, the methods described below are stored as software programs in a computer-readable storage medium and are configured for running on a computer processor. Furthermore, software implementations can include, but are not limited to, distributed processing, component/object distributed processing, parallel processing, virtual machine processing, which can also be constructed to implement the methods described herein.

Figure 2:
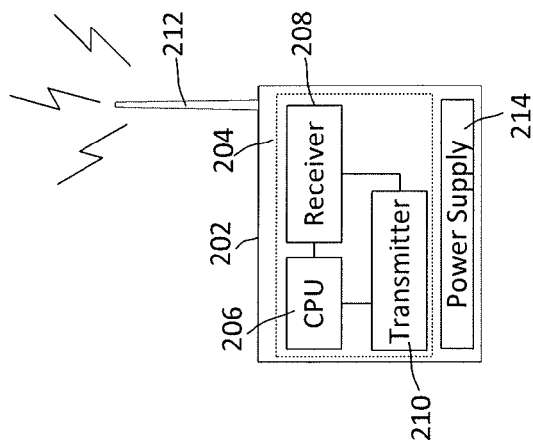
FIG. 2, is a diagram that is useful for understanding a frequency agile ad hoc network that incorporates dynamic spectrum access methods.
Figure 2:
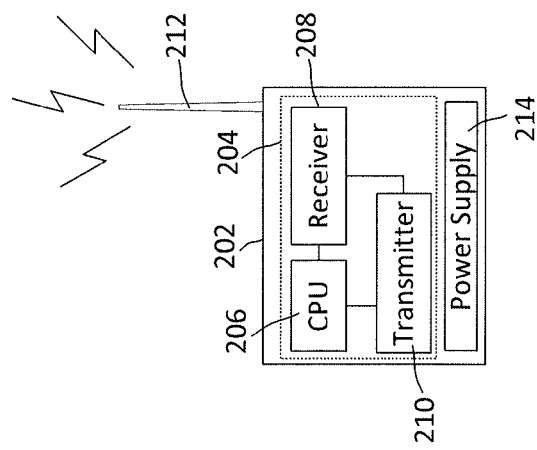
Figure 2:
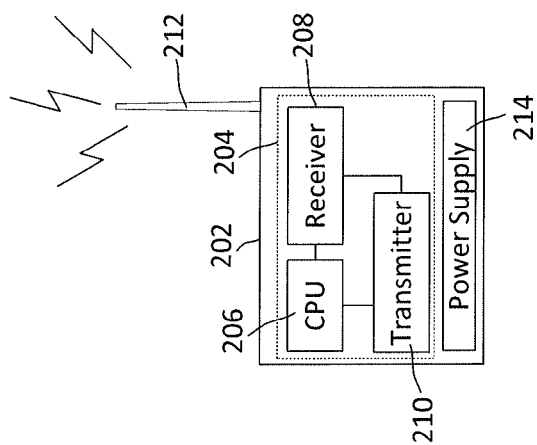

Turning now to FIG. 2, there is shown a schematic representation of a communication system in accordance with some embodiments of the present disclosure. The communications system 200 can include one or more communication devices 202 which can include a cognitive radio 204. The cognitive radios 204 can have an architecture similar to the cognitive radio 100 described herein with respect to FIG. 1. The cognitive radios 204 can include all or some of the functionality of cognitive radio 100. Accordingly, the cognitive radio 204 can include a central processing unit (CPU) or processor 206 arranged in communication with a receiver 208 and a transmitter 210. Alternatively, a transceiver can be used in place of the receiver/transmitter combination.

The processor 206 can be programmed with a set of instructions for carrying out the methods and processes described herein for implementing an ad-hoc network. The processor can also be programmed to receive information concerning an RF environment, including for example spectrum sensing information. More particularly, the processor 206 is advantageously programmed to control the operation of receiver 208 to detect the presence of primary users or other forms of interference operating within a range of frequencies. This information can then be used by the processor 206 to classify various frequencies as either clear or occupied. A clear frequency is one where RF transmissions associated with a primary user or another source of interference are of negligible signal strength as compared to some predetermined threshold, or otherwise are not present. An occupied frequency is one that does contain RF transmission signals associated with a primary user or with a source of interference at levels that exceed some predetermined threshold signal level. Accordingly, the cognitive radio 204 can determine which portions of the RF spectrum contain frequencies that are currently occupied by primary users, and which frequencies are available for implementing an ad-hoc network. Techniques for evaluating the presence of primary users or potentially interfering signals are well known in the art and therefore will not be described here in detail. It should be understood that any suitable techniques or methods can be used for such spectrum analysis, regardless of whether such methods are known now or known in the future.

In the communication system 200, cognitive radios 204 are network nodes that communicate with one another to form an ad hoc wireless network. In an embodiment of the invention, the two or more cognitive radios 204 automatically change their transmission and reception frequencies in response to a spectral environment. This technique is commonly referred to as dynamic spectrum access ("DSA"). DSA type communications system are well known in the art, but present special design challenges. In order to appreciate these design challenges, it is helpful to understand several problems that arise in such systems. The term "rendezvous" refers to the ability of two or more radios to meet and establish a link on a common channel. When radios dynamically choose the frequency as when using DSA, neither the frequency nor the time at which to rendezvous is known. Opportunistic secondary DSA radios that wish to join an existing network potentially have a large number of potential frequencies on which to operate, and primary users and interference sources may be operating in a number of the potential frequencies.

When DSA is further applied to a network of ad hoc radios, additional problems arise. If an operating network has established that a certain frequency is available for use by the network, then the nodes in the network are able to use that frequency. If an ad hoc network is a single frequency network, existing radios in the network can agree that the current frequency is available. However, this use of the frequency may prevent the network from being joined by a new node that by sensing has determined that the very same frequency is actually being used by a primary user. In such a scenario, the new node is excluded. This scenario is referred to herein as "exclusion."

In the same operational case, where a single frequency DSA network is established, and one radio detects that a primary user has begun using the frequency that the network is using, a dilemma occurs. The radio may by policy not be allowed to transmit on the frequency of the network, and it cannot be sure that other nodes in the network have detected the presence of the primary user (because of proximity to the primary user). The radio may have to abandon the existing frequency and choose a new one. This operation may result in its exit from the network or bi-furcating of the network. This problem is referred to herein as the "abandonment" problem. Finally, in a single frequency network it may be difficult to perform effective "assessment" of interference or existence of a primary user. In other words, the radios in the network may have trouble monitoring for the existence of a primary user on the channel if the channel is already heavily used by the network. This is especially true if the data traffic that the ad hoc network is transmitting is heavy.

In order to avoid these problems, the cognitive radios 204 in communications system 200 are preferably frequency agile devices which communicate with one another using a plurality of frequencies. The cognitive radios 204 are synchronized so as to change frequency or "hop" in unison from one frequency to another, whereby the transmission and reception frequency are changed on a regular basis in each radio. Notably, the exclusion, abandonment, and assessment problems are effectively solved by the frequency agile or hopping solution. When the nodes in the ad hoc network observe different spectral environments, they will still with high probability identify a partly overlapping set of available hop frequencies on which they can rendezvous. Since there are almost always at least some overlapping hop frequencies, the "exclusion" problem is effectively solved. Also, when some nodes in the network observe primary users (or other interference) on one of the hop frequencies, they can immediately abandon that frequency, and can with high reliability inform other nodes on a different hop frequency. This enables cohesion of the network; nodes do not have to drop out of the network and established networks will not bifurcate when only a subset of nodes in the network detect changes in the spectral environment. This effectively solves the abandonment problem. Finally, the "assessment" problem is solved since nodes in the network routinely change hop frequencies, channel assessment can be scheduled at a time and on a frequency where it is known a priori that no traffic from the nodes own ad hoc network will occur.

According to a preferred embodiment, a relatively small set of frequencies are used in an active frequency hopping list for the frequency agility solution. This enables relatively fast rendezvous among nodes since there are fewer frequencies that must be monitored by a node attempting to discover an existing network hopping pattern. The method further establishes a priority list of the active frequencies, so that late net enterers or merging networks have a very high probability of identifying the frequency used among each one of the active frequencies. The algorithm for selecting frequencies has the property that a change of state of one frequency (i.e. frequency marked good at one node and bad at another) can at most affect the active list (operating frequencies) at only one node. The method described herein is also advantageous because it facilitates time aligning an epoch associated with the hopping sequence to a universal time source (such as a stable internal reference or GPS). Time aligning the epoch to a universal time source further simplifies and facilitates rendezvous. However, it should be appreciated that the method can operate with or without the need for such a time reference.

Figure 3:
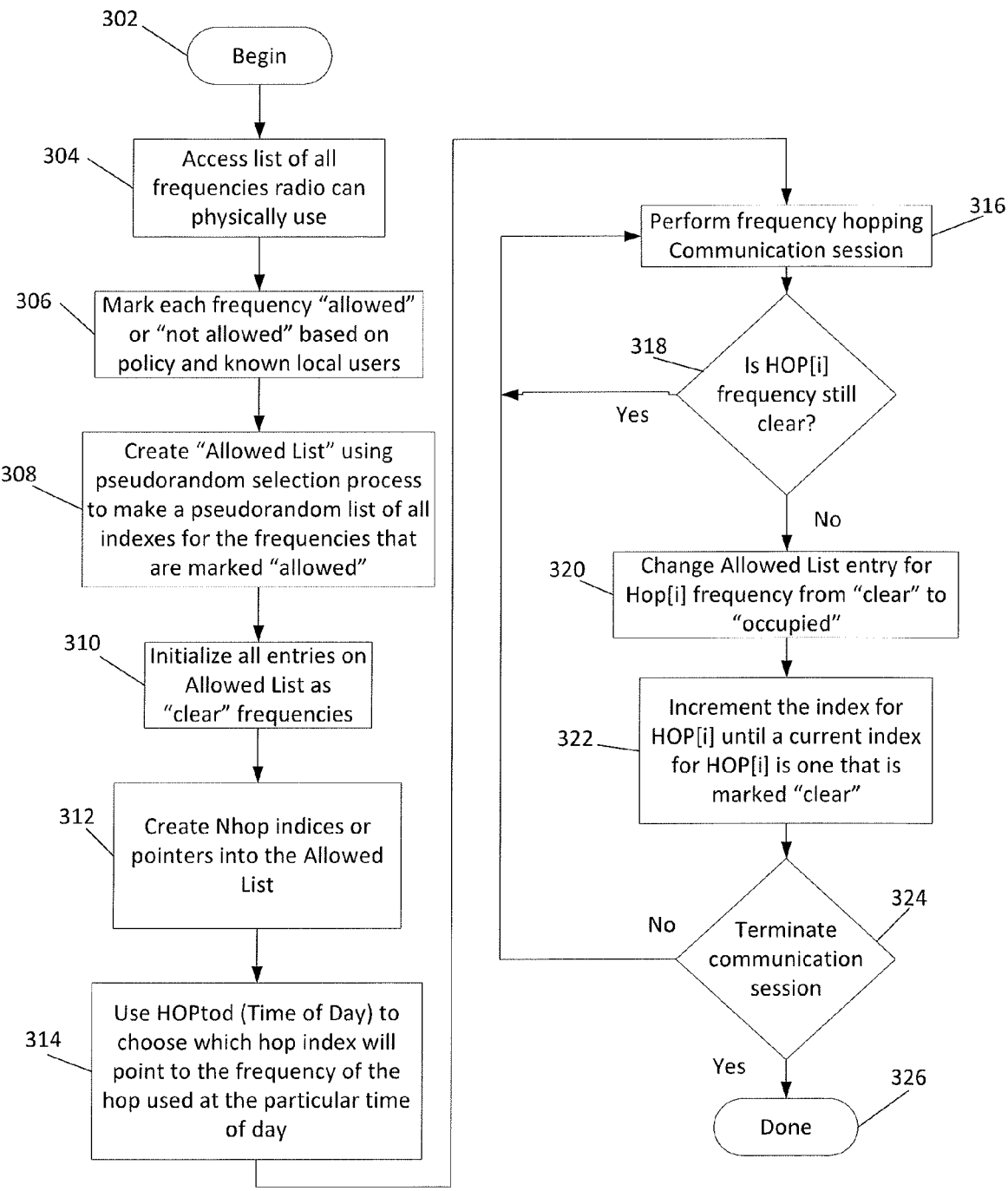
FIG. 3 is a flow chart that is useful for understanding the invention.

Referring now to FIG. 3 there is shown a flowchart that is useful for understanding the present invention. The flowchart illustrates a process that will be separately implemented in each node (i.e., each cognitive radio 204) that is part of the ad hoc network of communication system 200. The process begins in step 302 and continues with step 304, in which the node accesses a Master List of all RF frequencies that the cognitive radio 204 can physically use. The frequencies in the Master List are preferably separated by some predefined granularity or frequency spacing that is appropriate for the network. For example, the frequency granularity can be Fgran=500 kHz. Still, the invention is not limited in this regard and other frequency granularity values can also be used. The Master List of frequencies generated in step 304 can include all available frequencies within an operating frequency range over which a particular cognitive radio 204 can potentially communicate.

For example, in the frequency spectrum chart shown in FIG. 4, the frequencies over which the cognitive radio 204 can operate will range from $f_1$ to $f_c$. The frequencies available include frequencies $f_1$, $f_2$, $f_3$, ... $f_{Nall-1}$, $f_{Nall}$, $f_{Nall+1}$, $f_{Nall+2}$, ... $f_{c-1}$, $f_c$. These frequencies are spaced apart in accordance with the frequency granularity as specified above. Applying step 304 to the frequency spectrum chart in FIG. 4 yields a Master List 500 containing these frequencies as shown in FIG. 5.

In step 306, the authorization to make use of one or more frequencies on the Master List is specified by marking each frequency as "allowed" or "not allowed." Authorization is determined based on a policy and/or known local users operating on one or more of RF frequencies $f_1$, $f_2$, $f_3$, ... $f_{Nall-1}$, $f_{Nall}$, $f_{Nall+1}$, $f_{Nall+2}$, ... $f_{c-1}$, $f_c$. For purposes of illustration, we assume that in the spectrum chart of FIG. 4, the frequencies $f_{Nall+1}$, $f_{Nall+2}$, ... $f_{c-1}$, $f_c$ are "not allowed" due to the existence of one or more known local users 402. The Master List in FIG. 5 is marked with an authorization 502 in accordance with step 306 to show that frequencies $f_{Nall+1}$, $f_{Nall+2}$, ... $f_{c-1}$, $f_c$ are "not allowed." The policy used to mark the Master List can be any policy which specifies certain frequencies that are not permitted to be used by the communication system 200. The policy can be stored in a suitable memory location, such as main memory 116 in FIG. 1. Similarly, a list of known local users can be determined by any suitable means. For example, in an embodiment of the invention, information concerning known local users of frequencies from $f_1$ to $f_c$ can be predetermined and stored in a memory location, such a memory location contained in main memory 116. Alternatively, the information concerning known local users can be determined by spectrum monitoring performed by one or more cognitive radio 204.

In step 308, an Allowed List is created by making a deterministic list of all the index numbers assigned to the frequencies that have been marked "allowed" in step 306. Note that the index values referred to herein are those subscript values assigned to allowed frequencies in the Master List of FIG. 5. Accordingly, for RF frequencies $f_1$, $f_2$, $f_3$, ... $f_{Nall-1}$, $f_{Nall}$ contained in the Master List, the corresponding index values used in the Allowed List would be 1, 2, 3, ... Nall−1, and Nall; where Nall represents the total number fo frequencies on the Allowed List. An Allowed List 600 is shown in FIG. 6. For convenience in understanding the invention, an RF frequency list 601 containing an RF frequency corresponding to each index value is shown in a position adjacent to corresponding index value. The ordering of the index values in the Allowed List is created by a deterministic selection process. Accordingly, the resulting index values 1, 2, 3, ... Nall−1, and Nall contained on the Allowed List in FIG. 6 are shown in deterministic order. For example, the deterministic list can be created using a pseudorandom process. Pseudorandom selection processes are well known and therefore will not be described here in detail. However, it should be appreciated that any suitable pseudorandom process can be used for selecting a deterministic order of the index values contained in the Allowed List and the invention is not limited in this regard.

In step 310, all of the index values entered on the Allowed List 600 are initialized in a status list 602 as "clear" frequencies. A "clear" status indication means that a frequency corresponding to that particular index value is not occupied by a primary user and is therefore available for use. A set of pointers 604 can be used to point to particular frequency index values contained in the Allowed List 600. The purpose of the pointers will become more apparent as the description of the invention progresses.

Steps 304-310 can be performed in an automated way at each node based on stored data concerning known local users or other communications policies in effect. However, these steps can also be performed by a technician responsible for radio setup and initialization. For example, these steps can performed at a communications facility prior to deployment of each cognitive radio. Moreover, in some embodiments, the allowed frequencies can be assigned a rank value which specifies an order of preference among the allowed channels. In such embodiments, higher ranking frequencies which are more preferred will be given a higher preference for use in frequency hopping operations as compared to allowed frequencies having a lower rank. These and other aspects of the invention will be presented in further detail below.

In the present invention, the cognitive radios 204 which comprise each node of the communication system 200 are frequency agile, meaning that they hop in unison from one frequency to the next. The communication frequency used by the ad hoc network of radios is constantly changing with each hop. This concept is illustrated in FIG. 7, which shows that the nodes of the communication system 200 can communicate for some predetermined period of time at a particular RF frequency during at HOP[0], transition to a different RF frequency at HOP[1], and transition to another frequency at HOP[2]. The process continues this way, changing frequency with each hop for some predetermined number of hops, before returning to the Hop[0], at which point the hoping sequence is repeated. As will be understood from FIG. 7, Nhop is some value which represents the number of frequencies that the radio can hop over at a given time. The value of Nhop can be determined in a variety of ways. For example, in some embodiments, the value of Nhop can be pre-set as part of a system design. In other embodiments, the value of Nhop can be determined dynamically. For example, the number of hop frequencies in the sequence can be determined by the number of frequencies available, the existence of interference sources or jammers, and so on.

In step 312, the process continues by creating a total of Nhop pointers into the allowed list. One pointer value is assigned for each frequency hop to specify the frequency to be used during that hop. A set of pointers $800_1$, $800_2$, $800_3$, ... $800_{Nhop}$ is illustrated in FIG. 8. Each pointer $800_1$, $800_2$, $800_3$, ... $800_{Nhop}$ has a value which points to one of the frequencies on the Allowed List 600 in FIG. 6. For example, the pointer for Hop[0] in FIG. 8 is shown to have a value of 2. It can be observed that pointer value 2 points to frequency $f_4$ in FIG. 6. Accordingly, the frequency assigned to Hop[0] is $f_4$. Similarly, the pointer for Hop[1] is shown to have a value 0, which points to RF frequency $f_2$ in FIG. 6. Accordingly, the frequency assigned to Hop[1] in this example is $f_2$. Each hop thus has a pointer which references a particular RF frequency for that hop. According to a preferred embodiment, each of the pointers is set to some initial value, but this value can change dynamically during a hopping session in accordance with a dynamic frequency assignment scheme.

Figure 9:
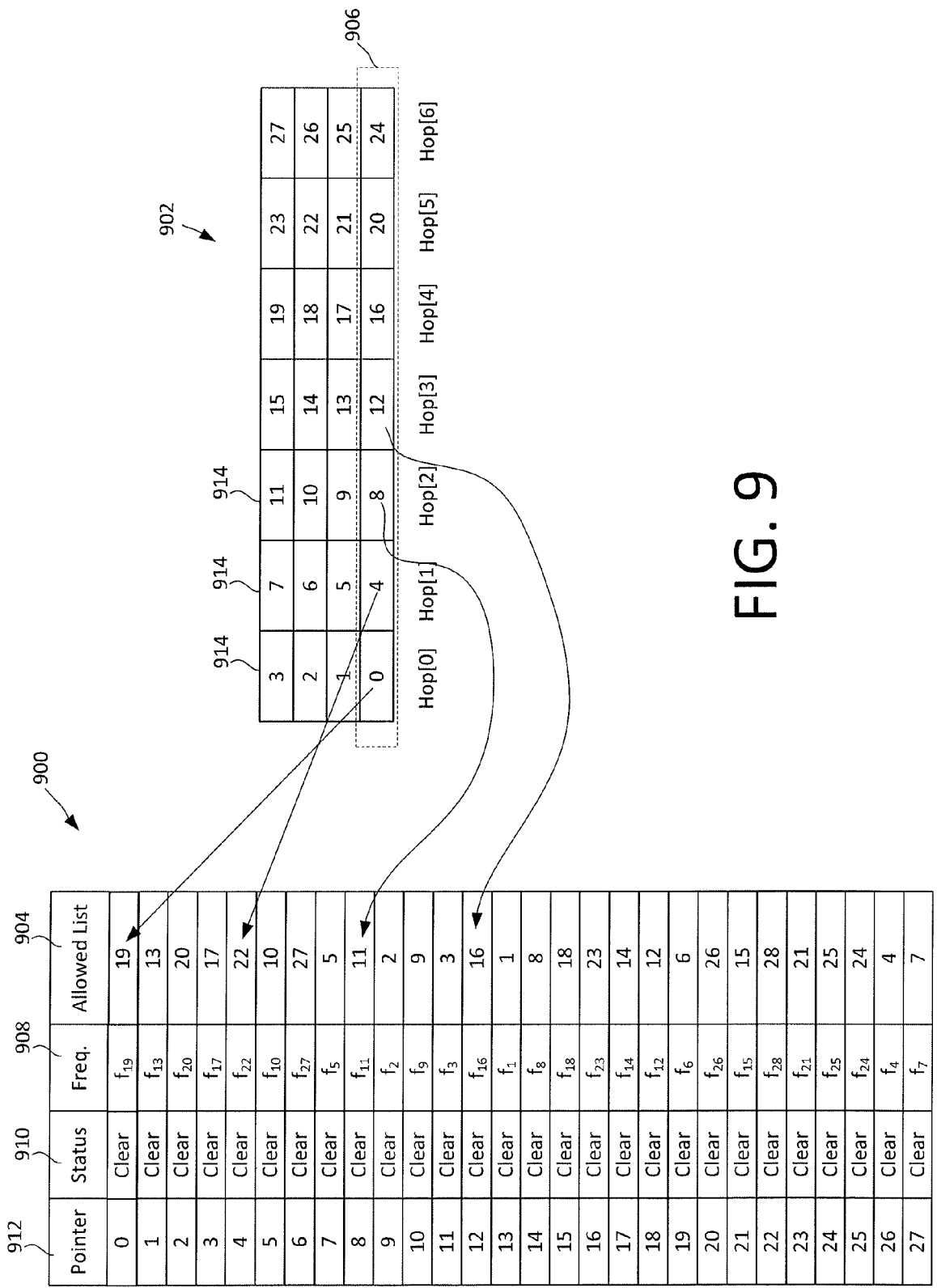
FIG. 9 is an exemplary hopping list and an array of pointers.

According to one embodiment, the initial values for the pointers in FIG. 8 can be determined by based on the integer part of the sequence:

$$0, *Nall/Nhop, 2*Nall/Nhop, 3*Nall/Nhop, \ldots (Nhop-1)*Nall/Nhop$$

where Nall represents the total number of frequencies on the allowed list, and Nhop represents the number of frequencies the radios can hop over in a hopping sequence. The foregoing concept is illustrated in FIG. 9 which shows an exemplary table 900 that is similar to the table described in FIG. 6. Accordingly, table 900 includes Allowed List 904, and a list 908 of frequencies corresponding to each index on the Allowed List. The Allowed List 904 is a deterministic list of index values corresponding (in this example) to 28 allowed frequencies (Nall=28). In FIG. 9, the value of Nhop is assumed to be 7, meaning that there are a total of 7 hop frequencies that are used in a hopping sequence. Using the values Nall=28 and Nhop-=7 in the sequence stated above, the initial values for the pointers would be 0, 4, 8, 12, 16, 20, and 24. These initial values 906 are arranged in a tabular format in an array 902. As may be observed in array 902, the remainder of the index values not used as initial values are also contained in the array, and are arranged in sequence in columns 914 corresponding to each hop. In some embodiments of the invention, pointers can be initially set only to allowed frequencies having a higher order of preference as compared to other frequencies on the allowed list.

The pointers in array 902 point to index values in the Allowed List 904. The pointers specify which one of the allowed frequencies will be used for each hop. In the example shown in FIG. 9, the pointer for Hop[0] has an initial value of 0, which points to frequency index value 19 in the Allowed List 904. Accordingly, the RF frequency assigned to Hop[0] is $f_{19}$. Hop[1] has an initial value of 4, which points to frequency index value 22 in the Allowed List 904. Accordingly, the RF frequency assigned to Hop[1] is $f_{22}$. Hop[2] has an initial value of 8, which points to frequency index value 11 in the Allowed List 904. Accordingly, the RF frequency assigned to Hop[2] is $f_{11}$. Each hop is assigned an initial frequency in this way.

In step 314, a function HOPtod(time of day) can choose which hop index points to the frequency of the hop used at the particular time of day. Any suitable function can be used for this purpose. According to some embodiments, the time of day information can be provided by a satellite signal, such as a GPS time signal. The HOPtod function coordinates the timing of each node and ensures that each node is communicating using the correct hop index at correct time. The HOPtod function will change the hop index at each node after each frequency hop.

In step 316, with the frequency for each hop having been established in the foregoing steps, the cognitive radios 204 of the communication system 200 can begin communicating using the frequency hopping sequence specified by the initial values 906. However, at any time during a frequency hopping communication session, a primary user or some other source of RF interference may begin using an allowed frequency within the frequency spectrum 400 shown in FIG. 4. Accordingly, each cognitive radio 204 can periodically monitor the frequencies in the hopping sequence to determine whether the status of such channels is still "clear". If the channel is not clear (318: No) then in step 320, the cognitive radio 204 will change the status 910 for that frequency from "clear" to "occupied". Thereafter, in step 322, the cognitive radio will increment the pointer for HOP[i] to the next pointer on the list until a current index for HOP[i] is one that is marked "clear".

An example of the frequency incrementing process will now be described with reference to FIG. 9. For this example, we note that in array 902, Hop[3] has an initial pointer value of 12. With reference to table 900, it can be observed that index value 12 corresponds to frequency $f_{16}$. Assume that it is determined that RF frequency $f_{16}$ is occupied. In such event, the pointer for Hop[3], will need to be incremented to the next available pointer value. Accordingly, the initial pointer value for HOP[3] is incremented from 12 to 13. If the RF frequency corresponding to pointer 13 is also occupied, then the pointer value can be incremented again to pointer 14. For purposes of this example, assume that pointer 14 is "clear" so the new frequency for Hop[3] will be $f_8$ as per table 900.

Figure 10:
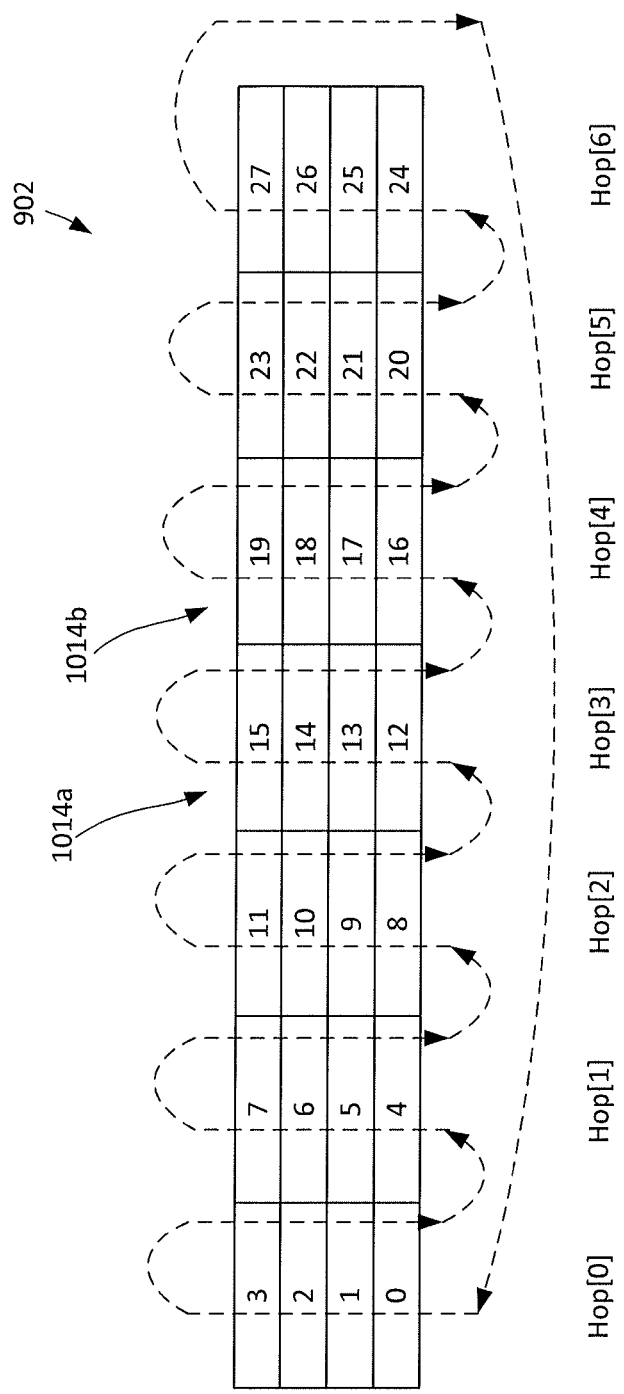
FIG. 10 shows how pointers can be incremented in the array of FIG. 9.

This incrementing process is further illustrated in FIG. 10. The arrows in FIG. 10 show that pointer values are incremented in for each hop until a clear channel is located. Accordingly, in the case of Hop[3] described above, if a status 910 of the RF frequencies corresponding to pointers 13, 14, and 15 are all marked "occupied" (as opposed to "clear") then the pointer can continue incrementing from column 1014*a*, into the adjacent column 1014*b*. Thus, pointers 16, 17, and 18 can be checked to see if they correspond to frequencies status 910 marked "occupied" or "clear". For example, if pointer value 18 is marked "clear" then that pointer can be assigned to Hop[3] and the system can resume the hopping sequence. Note with the foregoing dynamic frequency assignment method, changing one of the hop frequencies does not generally affect the frequencies assigned to the other hops in a sequence. It can also be understood from FIG. 10 that the incrementing will roll over to pointer zero (0) when incrementing beyond the final value in the sequence (Nall−1), which in this case is 27.

In some embodiments, the incrementing process can also involve consideration of the relative preference among available RF frequencies. For example, if a particular pointer is incremented to a clear channel, but the clear channel has a relatively low rank or (i.e., the frequency is not preferred), then the pointer value can be further incremented until a clear channel is identified with a higher rank or preference for use. The system can increment through the entire list to search for clear channels with higher rank or can select a clear channel with highest rank from among the first two or three clear frequencies that are available.

The frequency agile network described in FIGS. 1-10 has several advantages over conventional arrangements. An ad hoc network using frequency hopping and dynamic spectrum access (DSA) methods as described herein will allow greater opportunities for cognitive radio terminals 204 to communicate with the network when some frequencies local to the particular radio are jammed. Hopping also allows for the evaluation of the frequencies that are in the current hop sequence because none of the frequencies are used continuously. In other words, there will always be times when each frequency is not being used by the network, and therefore its use by other services can be monitored. Another advantage is that the network is highly stable since it uses a list of allowed frequencies that are essentially fixed.

Figure 11:
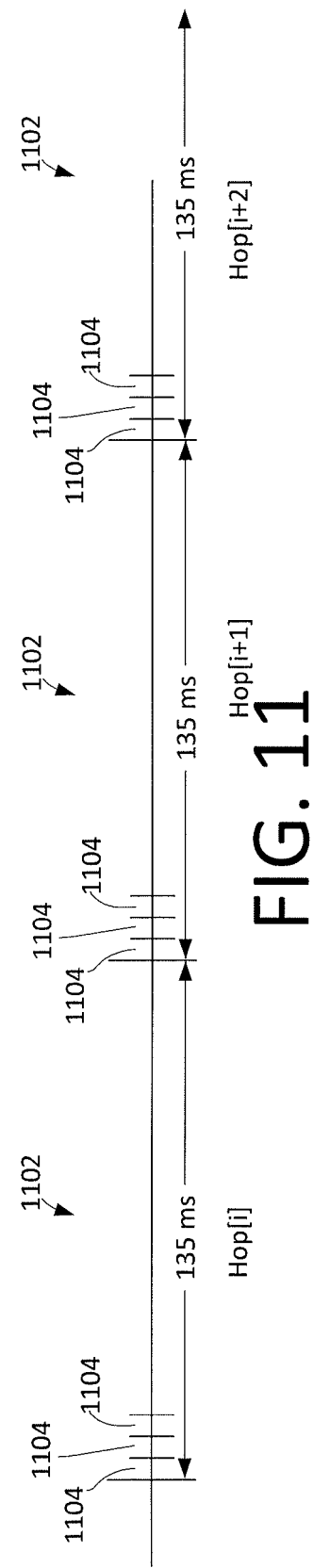
FIG. 11 is a drawing that is useful for understanding a timing associated with a hopping sequence.

In an embodiment of the invention, an ad hoc network described in relation to FIGS. 1-10 will hop at some epoch rate. For example, the epoch rate can be 135 milliseconds in length. FIG. 11 shows a hopping sequence having an epoch 1102 which has an epoch rate of 135 milliseconds. During each epoch, nodes will communicate with each other using an RF frequency assigned for that particular hop in accordance with the dynamic frequency assignment methods described herein. Each epoch 1102 can include certain time periods or time slots which are designated as beacon slots 1104. Each node (e.g. a node defined by a cognitive radio 204) will be assigned a beacon slot. In some embodiments of the invention a beacon slot can be a relatively small portion of the overall epoch. For example, each beacon slot can be about 2 milliseconds in duration, and can comprise about 192 bits. Still, it should be appreciated that the invention is not limited to the timing or bit lengths stated herein. Each node is assigned one of the beacon slots 1104, during which time the node can communicate certain information relevant for communicating. For example, the node can communicate information concerning nodes that they intend to communicate with, transmission data rates, a time slot within the epoch that they will use to transmit, the nodes they are communicating with and so on.

Significantly, nodes can also communicate during the beacon slot 1104 certain information concerning occupied frequencies. In particular, the various nodes can share the spectrum sensing information they have collected regarding spectral conditions at their location. The nodes can further communicate during the beacon slot 1104 an index number for a frequency that they intend to use for their next transmission. This information can be used by nodes which are late entrants to the network for purposes of synchronizing their hopping frequencies with the hopping frequencies actually in use by the network. In this regard it must be understood that all nodes within the network are configured to generate their deterministic Allowed List 904 using the same methods as other nodes of the network. Consequently, the Allowed List 904 that is generated and used for each node in the network should be identical. Likewise, each node will generate the same array 902, with the same initial index values 906. Each node will utilize the same set of hopping frequencies, and if a hopping frequency should change, each node will transition to a new frequency for that hop in the same way by incrementing through the index values in array 902.

Whenever a terminal finds a frequency that is in use by a primary user, it will transmit (during its beacon slot 1102) the index of that frequency, together with a tag which specifies that the frequency corresponding to that index is "occupied". Any node receiving this information will retransmit the "occupied" message for that index during its own beacon slot 1102, until such time as the node hears all of its neighbors send the same message. This process ensures that information concerning occupied frequencies is rapidly disseminated to all nodes in the network.

By utilizing the methods described herein, frequency hopping will occur over a relatively small list of frequencies contained on an Active List of frequencies. As will be appreciated from the discussion relating to FIGS. 3-11, this list is actually an array of pointers into the larger list called the Allowed List 904. All members of the network have the same Allowed List, in the same order; which does not change. The Active List will start out as a set of initial values 906 but will change over time. Still, the Active List should be the same for all nodes except for transient conditions that occur when a primary user is detected, and a hop frequency is changed. Even then, the Active List for each node should be mostly the same.

Whenever a node has time when it is not scheduled to receive or transmit, it will scan frequencies for primary users. Both the Active List and candidate frequencies are scanned. Candidate frequencies can include any of the frequencies in the Allowed List. Whenever a node detects a primary user on a frequency, it communicates the index value for the frequency together with a tag which marks the frequency as "occupied". This tag and index then flood the network. Detection of a primary user or reception of an occupied index causes a node to immediately abandon the frequency unless the network is currently operating on a single frequency. This is an important advantage insofar as it ensures that any node can cause the entire network to discontinue sue of an occupied frequency. Moreover, the process of abandoning occupied frequencies begins immediately when a primary user has been detected, thereby providing practically instantaneous abandonment of occupied frequencies. Upon abandonment of a frequency, the next candidate frequency is used in its place. A mechanism for recovery can be provided for retesting frequencies that have previously been marked 'occupied' since this state could change due to the passing of time and change of location of the network.

Each node will respond to an "occupied" frequency message as if it had detected the occupied frequency itself. In other words, it will execute the pointer incrementing process described above in relation to FIG. 10. Should a first node detect an occupied frequency during the same hop as it receives a notification of a different occupied frequency from a second node, then the first node can send its own notification concerning the occupied frequency first, and can queue the notification from the second node. If a node receives multiple notifications of different occupied frequencies during the same hop, then it can randomly select which notification to re-transmit first, and can queue the other notification(s) for re-transmission during a subsequent epoch.

When there are no messages to be sent concerning "occupied" frequencies, a node will send either the frequency to be used during the next hop of the network or the frequency to be used for the hop after that (next hop+1). The choice between the next and after-next frequencies can be made randomly and independently by the nodes. These frequencies are sent to facilitate net synchronization for nodes that are late entrants into the network, or for any other nodes that may have somehow become partly out of synchronization with the remainder of the net.

Recovery of an "occupied" frequency can be accomplished by any suitable means. For example, in step 320, when an Allowed List index entry is changed from "clear" to "occupied," the entry can also be marked with a time stamp which indicates the time when the change occurred. Thereafter, in step 322 whenever a Hop[i] index at a node is incremented to a frequency that is listed as "occupied," it accesses the time stamp, adds to this time stamp value a persistence value, and compares the result to the current time. If the value is less than the present time, the node can schedule a scan of the frequency corresponding to that particular Allowed List index. If the value is greater than the present time, then the node takes no action with regard to that particular Allowed List entry, and simply increments on to the next frequency. In the case where a scan of the frequency is scheduled, the node will perform a scan of the frequency at the earliest opportunity corresponding to the scan schedule. At that time, a scan of the frequency will permit the node to determine if the frequency is locally unoccupied. If so, the radio will broadcast a request to the network for recovery of that frequency which is presently marked "occupied". Every node that receives the recovery message will schedule a scan of the frequency and will forward the result to a net master node. If the net master node receives unanimous consensus from the network that the frequency is no longer occupied, it sends a message with a down count value. The down count value is decremented with each new frequency hop, regardless of whether the message is stationary or in transit from one node to another. On the hop when the down count value reaches zero, the frequency which was previously marked "occupied" is marked as "clear" for the next appropriate hop.

A late net entry node is a node that attempts to enter the network at some time after the node has already been established. It is anticipated that such network will start out with a set of initial pointer values 906, but over time will have migrated to pointer values that are different from those initial values in accordance with steps 318, 320, 322 as previously described. A late net entry node in such a scenario will also start out with the set of initial pointer values 906, but will lack information concerning how the pointer values have changed over the course of time. Accordingly, the late net entry node must have some process by which it can discover the hop frequencies that are currently in use by the network. This process can begin with the late net entry node initializing its initial pointer values 906 to the net start-up condition.

In a first scenario, it is assumed that the network relies on a time reference, such as a time clock signal received from a global positioning system (GPS). In such an embodiment, the timing of each epoch and associated beacon time slots 1104 will be determined by a GPS time of day. The late net entry node will monitor each of the initial Nhop frequencies specified by initial pointer values 906 to look for beacon signals during beacon time slots 1104. The nodes will use the GPS time of day (TOD) information to determine the time during which the beacon transmissions should be present. For each Hop[i], the node will monitor the frequency corresponding to an initial pointer value 906. Each time the node fails to detect a beacon signal during a particular Hop[i], the node will increment to the next pointer value (e.g. in array 902) for that particular Hop[i]. If the node is successful during any hop in finding a beacon, then the next and next+1 information is extracted from the beacon signal, if available, and loaded into the next and next+1 Hop[i] pointers. This process of monitoring, incrementing, extracting and loading is repeated until all Hop[i] indices point to frequencies with valid beacons.

In a second scenario, it is assumed that the network does not rely upon a time reference (e.g. a GPS time) for specifying a time of day for the beginning and end time of each Hop[i]. In this scenario, the late net entry node will not know the time of day when each epoch 1102 will begin/end and therefore will not know the time of a beacon time slot 1104. Accordingly, a late net entry node will monitor for beacon signals on each frequency according to an initial set of pointer values 906. The late net entry node will dwell on each frequency for Nhop+1 hop durations. After each dwell, the next hop index is used. Each Hop[i] that fails to find a beacon during the dwell time is incremented to its next value (e.g. following the pattern shown in FIG. 10). If the node is successful during any hop in finding a beacon, then the next and next+1 information is extracted from the beacon signal, if available, and loaded into the next and next+1 Hop[i] pointers. This process of monitoring, incrementing, extracting and loading is repeated until all Hop[i] indices point to frequencies with valid beacons.

The terminology used herein is for the purpose of describing particular embodiments only and is not intended to be limiting of the invention. As used herein, the singular forms "a", "an" and "the" are intended to include the plural forms as well, unless the context clearly indicates otherwise. Furthermore, to the extent that the terms "including", "includes", "having", "has", "with", or variants thereof are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

We claim:

1. A method for dynamic spectral assignment in an ad hoc network including a plurality of wireless network nodes, comprising:
   using a computer processing device in at least one of the plurality of wireless network nodes to perform frequency selection operations which include
   determining a set of allowed frequencies from a plurality of pre-specified frequencies that can be used by said ad hoc network,
   assigning an index value to each allowed frequency of said set of allowed frequencies,
   creating an allowed list comprised of said index values arranged in a deterministic order,
   determining a first plurality of pointers respectively pointing to said index values contained in said allowed list, and
   dynamically selecting an initial set of pointers from said first plurality of pointers based on a value of a total number of frequency hops that said wireless network nodes can perform over a given period of time and a total number of allowed frequencies in said set of allowed frequencies, each pointer of said initial set of pointers specifying one of said allowed frequencies to be used as an initial value for a corresponding one of said frequency hops;
   performing a wireless frequency hopping communication session among the plurality of wireless network nodes in said ad hoc network, using a frequency for each said frequency hop specified by said initial set of pointers; and
   dynamically assigning with said computer processing device an updated pointer value to selected ones of said frequency hops to specify an updated frequency to be used for that frequency hop of a hopping sequence.

2. The method according to claim 1, wherein said deterministic order is determined in accordance with a pseudorandom selection process common to each of said plurality of wireless network nodes, whereby said allowed list maintained by each of said plurality of wireless network nodes contains said index values arranged in the same deterministic order.

3. The method according to claim 1, wherein said initial set of pointers is dynamically selected according to a defined selection process common to each of said plurality of wireless network nodes, whereby said initial set of pointers is the same for each of said plurality of wireless network nodes.

4. The method according to claim 1, further comprising specifying each index value as corresponding to a clear frequency, said clear frequency indication meaning that said allowed frequency is available for use by said ad hoc network.

5. The method according to claim 4, further comprising monitoring at each of said plurality of wireless network nodes during said frequency hopping communication session allowed frequencies to determine if said allowed frequencies contain RF signals not associated with said ad hoc network.

6. The method according to claim 5, further comprising specifying that an index value corresponds to an occupied one of said allowed frequencies if it is determined that signals foreign to said ad hoc network are present on said allowed frequency.

7. The method according to claim 6, wherein said dynamically assigning step is performed when a pointer value corresponds to an index value that is specified as occupied.

8. The method according to claim 6, further comprising monitoring said occupied one of said allowed frequencies, and initiating a process to restore said index value to a clear frequency across said ad hoc network if said occupied one of said allowed frequency is absent of RF signals which are foreign to the ad hoc network.

9. The method according to claim 5, further comprising transmitting, during a predetermined beacon slot time period of a hop duration, an index of an allowed frequency together with a tag which specifies that the allowed frequency corresponding to said index is occupied, if it is determined that signals foreign to said ad hoc network are present on said allowed frequency.

10. The method according to claim 9, wherein said transmitting is performed by a first node of said plurality of wireless network nodes that determines said signals foreign to said ad hoc network are present.

11. The method according to claim 10, further comprising retransmitting said index and said tag during subsequent beacon slot time periods, until receiving the index and the tag from at least one neighbor node of said plurality of wireless network nodes.

12. The method according to claim 10, further comprising retransmitting from a second node of said plurality of wireless network nodes said index and said tag during subsequent beacon slot time periods.

13. The method according to claim 10, further comprising facilitating late entry of one or more late entering wireless network nodes to the ad hoc network by transmitting as part of said beacon signal information to specify a frequency to be used by the ad hoc network on at least one subsequent frequency hop of said wireless frequency hopping communication session.

14. The method according to claim 5, wherein said allowed frequencies that are monitored include frequencies currently in use in said wireless frequency hopping communication session, and candidate frequencies that could be used if a frequency that is currently used for said wireless frequency hopping communication session becomes occupied by RF signals foreign to said ad hoc network.

15. The method according to claim 1, wherein said dynamically assigning step comprises incrementing a pointer value to a next pointer value contained in an array of pointer values.

16. The method according to claim 15, wherein said dynamically assigning step further comprises evaluating a relative preference for a frequency corresponding to a pointer value.

17. The method according to claim 1, further comprising determining said set of allowed frequencies based on at least one of a predetermined policy and known local users of a frequency spectrum.

18. The method according to claim 1, further comprising transmitting by each wireless network node of said plurality of wireless network nodes a beacon signal during a predetermined beacon slot time period of a hop duration.

19. The method according to claim 18, wherein said beacon signal is transmitted using a frequency specified for each said frequency hop specified by said first plurality of pointers.

20. A system for dynamic spectral assignment in an ad hoc network of wireless network nodes, comprising:
   a wireless network node including at least one computer processing device configured to:

determine a set of allowed frequencies from a plurality of pre-specified frequencies that can be used by said ad hoc network;

assign an index value to each allowed frequency of said set of allowed frequencies;

create an allowed list comprised of said index values arranged in a deterministic order;

determine a first plurality of pointers respectively pointing to said index values contained in said allowed list;

dynamically select an initial set of pointers from said first plurality of pointers based on a value of a total number of frequency hops and a total number of allowed frequencies in said set of allowed frequencies, each pointer of said initial set of pointers specifying one of said allowed frequencies to be used as an initial value for a corresponding one of said frequency hops;

perform a wireless frequency hopping communication session among a plurality of said wireless network nodes in said ad hoc network, using a frequency for each said frequency hop specified by said initial set of pointers; and dynamically assign an updated pointer value to selected ones of said frequency hops to specify an updated frequency to be used for that frequency hop of a hopping sequence.

21. The system according to claim 20, wherein said deterministic order is determined in accordance with a pseudorandom selection process common to each of said plurality of wireless network nodes, whereby said allowed list maintained by each said wireless network node contains said index values arranged in the same deterministic order.

22. The system according to claim 20, wherein said initial set of pointers is determined according to a defined selection process common to each of said plurality of wireless network nodes, whereby said initial set of pointers is the same for each said wireless network node.

23. The system according to claim 20, wherein said wireless network node is further configured to specify each index value as corresponding to a clear frequency, said clear frequency indication meaning that said allowed frequency is available for use by said ad hoc network.

24. The system according to claim 23, wherein said wireless network node is further configured to monitor during said frequency hopping communication session allowed frequencies to determine if said allowed frequencies contain RF signals not associated with said ad hoc network.

25. The system according to claim 24, wherein said wireless network node is further configured to specify that an index value corresponds to an occupied one of said allowed frequencies if it is determined that signals foreign to said ad hoc network are present on said allowed frequency.

26. The system according to claim 25, wherein said wireless network node is further configured to perform said dynamic assignment when a pointer value corresponds to an index value that is specified as occupied.

27. The system according to claim 24, wherein said wireless network node is further configured to monitoring said occupied one of said allowed frequencies, and initiate a process to restore said index value to a clear frequency across said ad hoc network, if said occupied one of said allowed frequencies is absent of RF signals which are foreign to the ad hoc network.

28. The system according to claim 24, wherein said wireless network node is further configured to transmit, during a predetermined beacon slot time period of said hop duration, an index of an allowed frequency together with a tag which specifies that the allowed frequency corresponding to said index is occupied, if said wireless network node determined that signals foreign to said ad hoc network are present on said allowed frequency.

29. The system according to claim 28, wherein said wireless network node is further configured to retransmit said index and said tag during subsequent beacon slot time periods, until receiving the index and the tag from at least one neighboring wireless network node.

30. The system according to claim 28, wherein a second wireless network node is configured to retransmit said index and said tag during subsequent beacon slot time periods.

31. The system according to claim 24, wherein said wireless network node is further configured to monitor said allowed frequencies including frequencies that are currently in use in said wireless frequency hopping communication session, and candidate frequencies that could be used if one of said frequencies that is currently used for said wireless frequency hopping communication session becomes occupied by RF signals foreign to said ad hoc network.

32. The system according to claim 20, wherein said dynamic assignment comprises incrementing a pointer value to a next pointer value contained in an array of pointer values.

33. The method according to claim 32, wherein said dynamic assignment comprises evaluating a relative preference for a frequency corresponding to a pointer value.

34. The system according to claim 20, wherein said wireless network node is further configured to determine said set of allowed frequencies based on at least one of a predetermined policy and known local users of a frequency spectrum.

35. The system according to claim 20, wherein said wireless network node is further configured to transmit a beacon signal during a predetermined beacon slot time period of a hop duration.

36. The system according to claim 35, wherein said wireless network node is further configured to transmit said beacon signal using said frequency specified for each said frequency hop of said hopping sequence specified by said initial set of pointers.

37. The system according to claim 35, wherein said wireless network node is further configured to facilitate late entry of other wireless network nodes to the ad hoc network by transmitting as part of said beacon signal information to specify a frequency to be used by the ad hoc network on at least one subsequent frequency hop of said wireless frequency hopping communication session.

* * * * *